United States Patent [19]
Elmore et al.

[11] Patent Number: 4,786,363
[45] Date of Patent: Nov. 22, 1988

[54] RADIAL SKIN EVAPORATOR

[75] Inventors: Carl L. Elmore; Charles W. Dier, both of Glens Falls, N.Y.

[73] Assignee: Kamyr, Inc., Glens Falls, N.Y.

[21] Appl. No.: 16,939

[22] Filed: Feb. 20, 1987

[51] Int. Cl.⁴ ............................................. B01D 1/22
[52] U.S. Cl. .................... 159/13.1; 159/28.6; 159/43.1; 159/49; 159/DIG. 15; 202/236; 202/266; 202/267.1; 203/89; 203/DIG. 22
[58] Field of Search ........... 202/236, 187, 266, 267 R, 202/270; 159/13.1, 13.3, 17.1, 28.6, 28.1, 43.1, 49, 47.3, 20.1, DIG. 31, DIG. 15; 203/86, 89, DIG. 22; 165/100, 101

[56] References Cited

U.S. PATENT DOCUMENTS

| | | | |
|---|---|---|---|
| 3,150,028 | 9/1964 | Wennerberg | 159/28.6 |
| 3,307,614 | 3/1967 | Rosenblad | 159/28.6 |
| 3,351,119 | 11/1967 | Rosenblad | 159/13.3 |
| 3,808,104 | 4/1974 | Davidson | 159/28.6 |
| 4,673,459 | 6/1987 | Elmore et al. | 203/98 |

FOREIGN PATENT DOCUMENTS 100923 1/1899 Fed. Rep. of Germany ..... 159/28.6

Primary Examiner—Wilbur Bascomb
Attorney, Agent, or Firm—Nixon & Vanderhye

[57] ABSTRACT

An evaporator includes heating elements which are part of a thin skin providing the evaporator vessel wall, supporting the skin for internal and external pressure, and a top portion of the vessel. A liquor distributing plate is supported on the heating elements, with a liquor inlet donut-shaped conduit disposed above the liquor distributing plate. The heating elements are radially disposed within the vessel, and are supported at the bottom by a ring which engages the bottoms of the heating elements, and a vertical axis tube extending from the vessel bottom to the ring, the tube having a plurality of through-extending openings formed in it. The vapor outlet for the vessel is concentric with the heating elements and the liquor distributing perforated plate. Heating fluid (e.g. steam) is introduced into the interior volumes of the heating elements adjacent the tops thereof, and a vent is provided adjacent the bottoms.

18 Claims, 2 Drawing Sheets

RADIAL SKIN EVAPORATOR

BACKGROUND AND SUMMARY OF THE INVENTION

In co-pending Ser. No. 746,092, filed June 18, 1985, now U.S. Pat. No. 4,673,459 (the disclosure of which is hereby incorporated by reference herein) a radial configuration evaporator structure is disclosed. Such a structure is very effective for performing its desired evaporating functions, evaporating liquor flowing as a film down the exteriors of the heating element plates. While the evaporator illustrated and described in said co-pending application is functionally very advantageous, it is desirable to be able to produce the evaporator at a lower cost.

According to the present invention, an evaporator is provided which is functionally comparable to the evaporator disclosed in said co-pending application, yet can be produced at a lower cost. The best structural feature that allows low cost production of the evaporator according to the present invention is the utilization of a thin skin as a side wall of the evaporator vessel, such a side wall preferably being provided by a continuous circumferential piece of stainless steel approximately ⅛th of an inch thick. The wall also cooperates with the pairs of parallel dimpled plates defining each of the heating elements, to cooperate with the plates to define a fluid tight interior volume for each of the heating elements. Such a structure compares to a ½ inch thick stainless steel body shell of an evaporator such as disclosed in said co-pending application. The heating elements themselves become a part of the structure which supports the skin for internal and external pressure as well as the dome of the vessel.

At the top of the heating elements, a liquor distributing means is provided. Such a means provides liquor that is to be evaporated by falling as a film down the exteriors of the plates of the heating elements. Such a distributing means preferably is provided by a perforated plate which is supported by the heating elements and a donut-shaped liquor introduction means disposed above the perforated plate for uniformly distributing introduced liquor around the plate. A vapor outlet for the evaporator is concentric with the radially disposed heating elements, and with the liquor distribution means, with a vapor outlet provided concentrically at the top of the vessel.

The vessel also includes a bottom portion which may be continuous with the circumferential wall of the vessel. The heating elements are supported at the bottoms thereof by a ring, the ring supported on the bottom of the vessel by a vertical axis tube. The tube walls have means defining a plurality of through-extending holes therein to allow liquor circulation. A transfer liquor outlet and a circulation liquor outlet are provided at the bottom of the vessel.

Heating fluid is introduced into the fluid tight interior volumes of the heating plates, preferably by an annular header adjacent the tops of the elements. A venting means is also provided for allowing spent heating fluid (e.g. steam) to escape from the interiors of the heating elements, the venting means preferably also provided as an annular header disposed adjacent the bottoms of the heating elements.

It is the primary object of the present invention to provide an evaporator having significant cost savings while still performing functionally to effectively evaporate introduced liquor. This and other objects of the invention will become clear from an inspection of the detailed description of the invention, and from the appended claims.

BRIEF DESCRIPTION OF THE DRAWINGS

FIG. 2 is a cross-sectional view of the evaporator of FIG. 1 taken along lines 2—2 thereof, and showing the section line about which FIG. 1 is taken (see line 1—1)

DETAILED DESCRIPTION OF THE DRAWINGS

Figure 1:
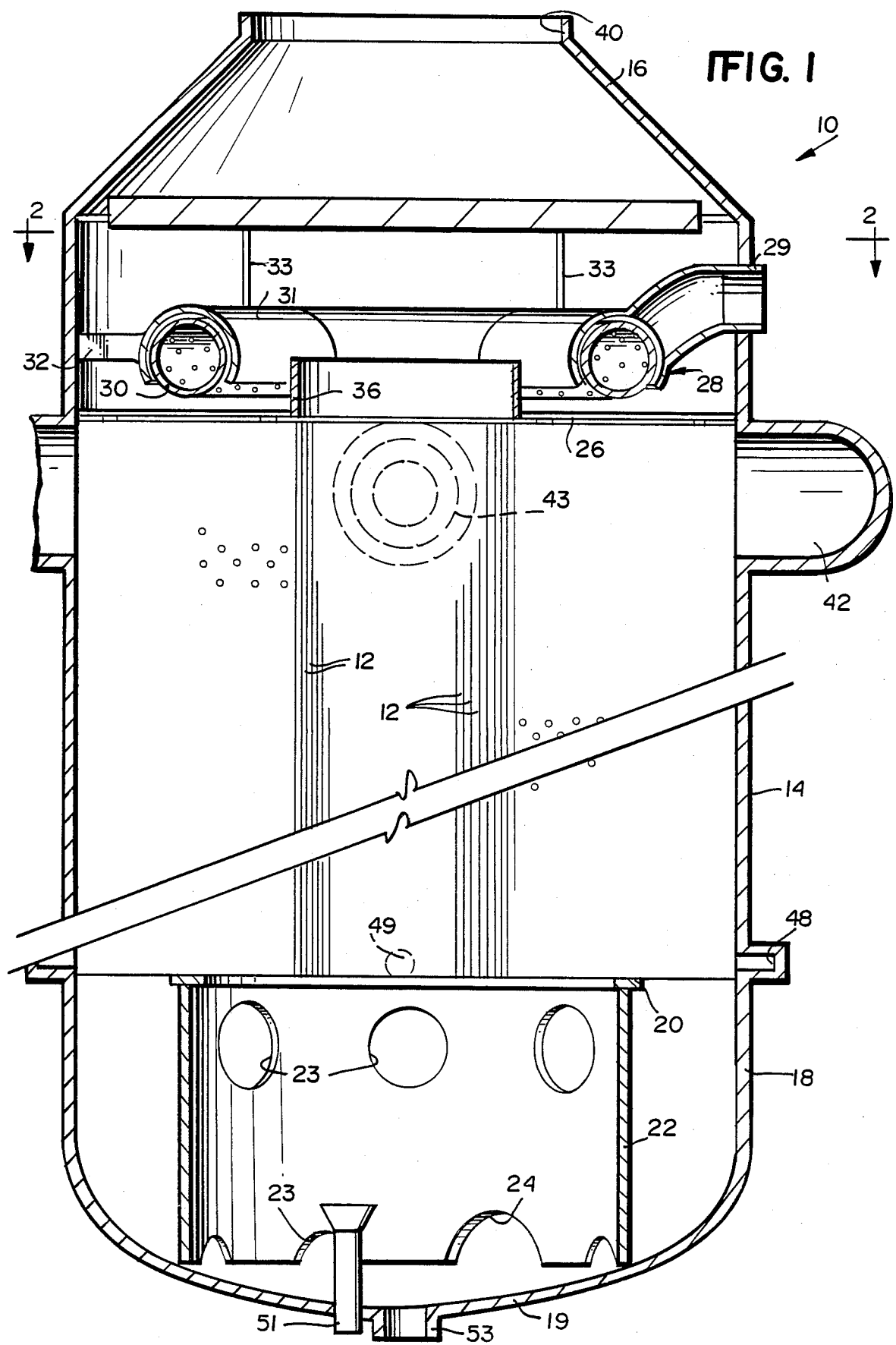
FIG. 1 is a side cross-sectional view of an exemplary evaporator according to the present invention.

An exemplary evaporator according to the present invention is shown generally by reference numeral 10 in FIG. 1. The main operative components of the evaporator 10 comprise a plurality of heating elements, shown generally by reference numerals 12 in FIG. 1. The heating elements each comprise a pair of parallel spaced plates, which preferably are dimpled, and define a fluid tight interior volume. Functionally the heating elements are identical to those described in co-pending application Ser. No. 746,092, filed June 18, 1985, now U.S. Pat. No. 4,673,459 (the disclosure of which is hereby incorporated by reference herein), and the constructions of the plates of the heating elements preferably are also as described in said co-pending application (e.g. dimpled).

Distinct from the heating elements disclosed in said co-pending application, the heating elements according to the present invention includes as a part thereof the thin skin, or side wall, 14 of the evaporator 10. The side wall 14 is a circumferentially continuous piece of metal, preferably a corrosion-resistant metal such as stainless steel or the like, which is welded or otherwise attached to the plates of the heating elements to define therewith the fluid tight interior volumes of each of the heating elements. Preferably, the side wall 14 is a continuous piece of stainless steel approximately ⅛th inch thick. With such a construction, the body shell (with ½ inch thick stainless steel plate) which surrounds and encloses the heating elements as in said co-pending application is eliminated. Yet the evaporator 10 according to the invention can function just as well as in said co-pending application since the heating elements themselves become part of the structure which supports the skin for internal and external pressure, as well as supporting the top dome 16 of the vessel 10.

The vessel 10 also includes a bottom portion 18 including a bottommost portion 19. A ring 20 is disposed at the bottoms of the heating elements 12—which extend radially within the evaporator 10—and supporting the ring 20 is a vertical axis tube 22 which has plurality through-extending openings 23, for allowing liquor circulation, formed therein. One of the openings, 24, preferably is large enough to function as a manway.

Figure 2:
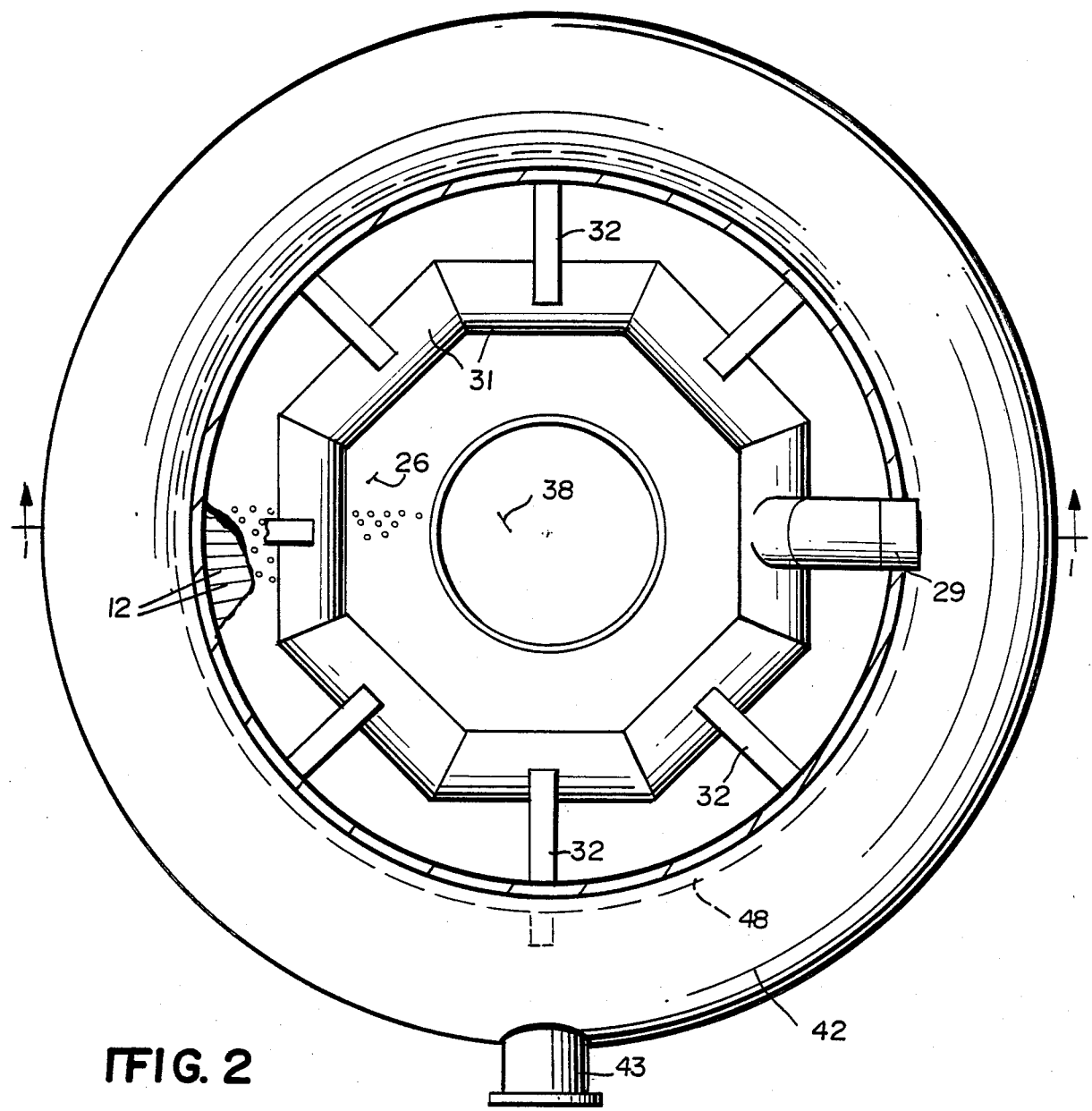

Supported at the tops of the heating elements 12 is a liquor distribution means, for distributing a liquor to be evaporated so that it falls as a film down the exterior side portions of the plates forming the heating elements 12, and is evaporated. The preferred liquor distribution means illustrated includes the annular perforated plate 26, which is disposed atop the heating elements 12, and a liquor inlet means shown generally by reference numeral 28. The liquor inlet means preferably comprises an inlet structure 29 extending through the side wall of the evaporator 10, and a generally donut-shaped perforated inlet conduit 30, with a shield 31 disposed covering approximately two-thirds the circumference of the conduit 30, but not the bottom third thereof. The inlet structure for the liquid, while generally donut-shaped, may have a polygonal configuration, as seen in FIG. 2. Note that the shield 31, as well as the conduit 30, components are supported by radially extending support elements 32 spanning the distance between the side wall of the evaporator 10 and the elements; additionally vertically extending suspension elements 33 (see FIG. 1) also may be provided if necessary.

A vapor outlet for the evaporator 10 is preferably provided at the top thereof, concentric with the heating elements 12 and the liquor distribution means. The vapor outlet means includes the collar 36 which is attached to the plate 26 and extends upwardly therefrom, and is continuous with the interior volume 38 within the group of heating elements 12; and the vapor outlet also is defined by the outlet structure 40 extending upwardly from the dome 16. The collar 36 and outlet 40 are concentric, as well as being concentric with the annular plate 26, the liquor distribution conduit 28, and the heating elements 12.

Heating fluid is introduced into the interior volumes of the heating elements 12 by the header 42 or the like. The heating fluid typically will be steam, or the like, but could be other vapors, gases, or liquids. In the preferred embodiment illustrated the heating fluid is introduced adjacent the tops of the heating elements 12, through the inlet 43 (see FIG. 2) to the header 42.

Figure 3:
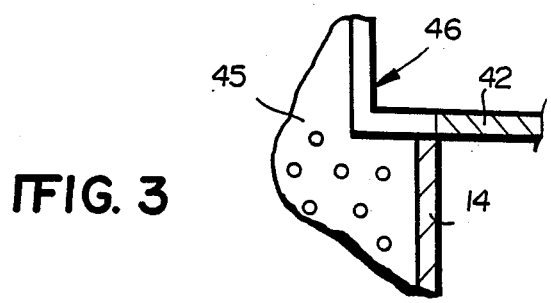
FIG. 3 is a detail cross-sectional view showing the cooperation between a heating element plate, the vessel side wall, and the heating fluid inlet header.

An exemplary interconnection of important components according to the invention is illustrated in FIG. 3. In FIG. 3 it will be seen that the side wall 14 defining the vessel which is the evaporator 10 cooperates with a dimpled plate 45 of a heating element 12 to define the fluid tight interior volume of that heating element. Heating fluid is introduced into the interior volume via a cut-out 46, which cooperates with the header 42.

Other operative components of the evaporator 10 include a vent means and liquor circulation outlets. The vent means typically may comprise a venting header 48 disposed at the opposite ends (e.g. bottoms) of the heating elements 12 as the heating fluid inlet header 42, with a common conduit 49 (see dotted line structure in FIG. 1) removing the vented, spent, heating fluid from the evaporator 10. The transfer liquor from the evaporator 10 preferably flows through outlet pipe 51, while the circulation liquor outlet is provided by a lead conduit 53 at the bottommost portion of the evaporator 10.

All of the fluid inlets and outlets to and from the evaporator 10 may be interconnected to other structures such as illustrated in said co-pending patent application.

Utilizing the evaporator 10 it will be seen that simultaneously liquor to be evaporated is introduced through inlet 29, and heating fluid (e.g. steam) to effect the evaporation is introduced through inlet 43. The steam flows into the interior volumes of the heating elements 12, the temperatures thereof thus being relatively high. Spent heating fluid is removed through venting means 48, 49.

The liquor to be heated flows into generally donut-shaped inlet conduit 30, being expelled through the perforations thereof and impacting on the shield 31, or flowing directly down onto the perforated plate, so that ultimately the liquor falls as a film down the exterior walls of the plates (e.g. 45) defining the heating elements 12. A portion of the liquor is evaporated, and that vapor flows into the interior core 38 within the heating elements 12, flows upwardly through collar 36 and out vapor outlet 40. The liquor that is not evaporated flows downwardly past the bottoms of the heating elements 12 into the bottom portion 18 of the evaporator 10, that liquor on the outside of the tubular support 22 flowing through openings 23 therein so that it too may access the transfer liquor outlet 51 or the circulation liquor outlet 53.

It will thus be seen that according to the present invention a cost-effective yet functionally efficient evaporator has been provided, which allows the elimination of the structural components of like functionally effective evaporators, while maintaining the functional efficiency thereof. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An evaporator assembly comprising:
   a plurality of sets of heating elements each comprising a pair of spaced plates defining therebetween an interior volume, said heating elements being spaced arcuately from each other and disposed so that they extend radially with respect to the center of a common circle to terminate in outer edges;
   a continuous circumferential vessel wall surrounding said heating elements and secured to said outer edges of the plates of said heating elements to define with and plates fluid tight interior volumes for said heating elements and for structural support from said plates;
   a heating fluid inlet for supplying heating fluid to the interior volumes of said heating elements;
   liquor distributing means diposed above said heating elements and supported thereby, for introducing liquid to be evaporated so that it flows as a film over the exteriors of the plates of said heating elements, and a portion thereof is evaporated;
   said continuous circumferential vessel wall, with a top portion and bottom portion, defining a vessel;
   vapor outlet means disposed at the top of said vessel; and
   supporting means for supporting said heating elements, disposed adjacent the bottom of said vessel.

2. An evaporator as recited in claim 1 wherein said continuous configuration circumferential vessel wall is approximately ⅛ inch thick, 3. An evaporator as recited in claim 2 wherein said vessel wall is of stainless steel.

4. An evaporator assembly comprising:
   a plurality of sets of heating elements each comprising a pair of spaced plates defining therebetween a fluid tight interior volume, said heating elements spaced arcuately from each other and disposed so that they extend radially with respect to the center of a common circle;
   a continuous circumferential vessel wall surrounding said heating elements and cooperating with the plates of said heating elements to define said fluid tight interior volumes of said heating elements;

a heating fluid inlet for supplying heating fluid to the interior volumes of said heating elements;

liquor distributing means disposed above said heating elements and supported thereby, for introducing liquid to be evaporated so that it flows as a film over the exteriors of the plates of said heating elements, and a portion thereof is evaporated;

said continuous circumferential vessel wall, with a top portion and a bottom portion, defining a vessel;

vapor outlet means disposed at the top of said vessel and extending concentrically through said liquor distributing means; and supporting means for supporting said heating elements, disposed adjacent the bottom of said vessel;

said continuous circumferential vessel wall being approximately ⅛th inch thick and formed of stainless steel.

5. An evaporator as recited in claim 4 wherein said liquor distributing means comprises a generally horizontally extending perforated plate supported by said heating elements; and further comprising a donut-shaped liquor inlet conduit for distributing liquor generally uniformly along said perforated plate; said vapor outlet concentric with said donut-shaped liquor inlet conduit.

6. An evaporator as recited in claim 5 further comprising support means operatively extending between said vessel wall and said liquor inlet conduit for mounting said liquor inlet conduit above said perforated plate.

7. An evaporator as recited in claim 6 further comprising venting means diposed in operative communication with said heating elements to vent spent heating fluid from the interior volumes defined by said heating elements.

8. An evaporator as recited in claim 7 wherein said heating fluid inlet is disposed adjacent the tops of said heating elements and said venting means is disposed adjacent the bottoms of said heating elements.

9. An evaporator as recited in claim 8 wherein said supporting means comprises a ring which engages the bottoms of said heating elements, and is supported by a tube having a vertical axis, said tube having means defining through-extending openings in the walls thereof.

10. An evaporator as recited in claim 9 wherein said bottom portion of said vessel includes a transfer liquor outlet extending therethrough, and a circulation liquor outlet extending therethrough.

11. An evaporator assembly comprising:
a plurality of sets of heating elements each comprising a pair of spaced plates defining therebetween a fluid tight interior volume, said heating elements spaced arcuately from each other and disposed so that they extend radially with respect to the center of a common circle;

a continuous circumferential vessel wall surrounding said heating elements and cooperating with the plates of said heating elements to define said fluid tight interior volumes of said heating elements;

a heating fluid inlet for supplying heating fluid to the interior volumes of said heating elements;

liquor distributing means disposed above said heating elements and supported thereby, for introducing liquid to be evaporated so that it flows as a film over the exteriors of the plates of said heating elements, and a portion thereof is evaporated;

said continuous circumferential vessel wall, with a top portion and a bottom portion, defining a vessel;

vapor outlet means disposed at the top of said vessel and extending concentrically through said liquor distributing means; and supporting means for supporting said heating elements, disposed adjacent the bottom of said vessel.

12. An evaporator assembly comprising:
a plurality of sets of heating elements each comprising a pair of spaced plates defining therebetween a fluid tight interior volume, said heating elements spaced arcuately from each other and disposed so that they extend radially with respect to the center of a common circle.

a continuous circumferential vessel wall surrounding said heating elements and cooperating with the plates of said heating elements to define said fluid tight interior volumes of said heating elements;

a heating fluid inlet for supplying heating fluid to the interior volumes of said heating elements;

liquor distributing means disposed above said heating elements and supported thereby, for introducing liquid to be evaporated so that it flows as a film over the exteriors of the plates of said heating elements, and a portion thereof is evaporated;

said continuous circumferential vessel wall, with a top portion and a bottom portion, defining a vessel;

vapor outlet means disposed at the top of said vessel;

supporting means for supporting said heating elements, disposed adjacent the bottom of said vessel;

said liquor distributing means comprising a generally horizontally extending perforated plate supported by said heating elements; and a donut-shaped liquor inlet conduit for distributing liquid generally uniformly along said perforated plate; said vapor outlet being concentric with said donut-shaped liquor inlet conduit.

13. An evaporator as recited in claim 12 further comprising support means operatively extending between said vessel wall and said liquor inlet conduit for mounting said liquor inlet conduit above said perforated plate.

14. An evaporator assembly comprising:
a plurality of sets of heating elements each comprising a pair of spaced plates defining therebetween an interior volume, said heating elements being spaced arcuately from each other and disposed so that they extend radially with respect to the center of a common circle to terminate in outer edges;

a continuous circumferential vessel wall surrounding said heating elements and secured to said outer edges of the plates of said heating elements to define with said plates fluid tight interior volumes for said heating elements and for structural support from said plates;

a heating fluid inlet for supplying heating fluid to the interior volumes of said heating elements;

liquor distributing means disposed above said heating elements and supported thereby, for introducing liquid to be evaporated so that it flows as a film over the exteriors of the plates of said heating elements, and a portion thereof is evaporated;

said continuous circumferential vessel wall, with a top portion and a bottom portion, defining a vessel;

vapor outlet means disposed at the top of said vessel;

supporting means for supporting said heating elements, disposed adjacent the bottom of said vessel; and venting means disposed in operative communication with said heating elements to vent spent heating fluid from the interior volumes defined by said heating elements.

15. An evaporator as recited in claim 14 wherein said heating fluid inlet is disposed adjacent the tops of said heating elements and said venting means is disposed adjacent the bottoms of said heating elements.

16. An evaporator assembly comprising:
a plurality of sets of heating elements each comprising a pair of spaced plates defining therebetween a fluid tight interior volume, said heating elements spaced arcuately from each other and disposed so that they extend radially with respect to the center of a common circle;
a continuous circumferential vessel wall surrounding said heating elements and cooperating with the plates of said heating elements to define said fluid tight interior volumes of said heating elements;
a heating fluid inlet for supplying heating fluid to the interior volumes of said heating elements;
liquor distributing means disposed above said heating elements and supported thereby, for introducing liquid to be evaporated so that it flows as a film over the exteriors of the plates of said heating elements, and a portion thereof is evaporated;
said continuous circumferential vessel wall, with a top portion and a bottom portion, defining a vessel;
vapor outlet means disposed at the top of said vessel; and
supporting means for supporting said heating elements, disposed adjacent the bottom of said vessel, said supporting means comprising a ring which engages the bottoms of said heating elements, and is supported by a tube having a vertical axis, said tube having means defining through-extending openings in the walls thereof.

17. An evaporator as recited in claim 16 wherein said bottom portion of said vessel includes a transfer liquor outlet extending therethrough, and a circulation liquor outlet extending therethrough.

18. An evaporator vessel including a side wall means, and a plurality of heating elements disposed interiorly of said side wall means, said side wall means cooperating with a pair of parallel spaced plates associated with each heating element to define a fluid tight interior volume for each heating element; said evaporator including a vessel top portion and a vessel bottom portion operatively connected to said wall means;
support means operatively associated with said vessel bottom portion for engaging the bottoms of said heating elements and providing, in addition to said wall means, support therefor;
a heating fluid inlet for supplying heating fluid to the interior volumes of said heating elements;
liquor distributing means for distributing liquid so that it flows in a falling film over said heating element plates so that a portion thereof is evaporated, said liquor distributing means including a perforated plate supported by said heating elements, with a liquor introducing conduit disposed above said perforated plate;
venting means for venting spent heating fluid from the interior volumes of said heating elements;
a vapor outlet from said vessel;
liquid outlets from said vessel; and
said support means comprising a ring which engages the bottoms of said heating elements, and is supported by a tube having a vertical axis, said tube having means defining through-extending openings in the walls thereof.

* * * * *